J. B. SMITH.
CORN CULTIVATOR.
No. 1,121. Patented Apr. 15, 1839.
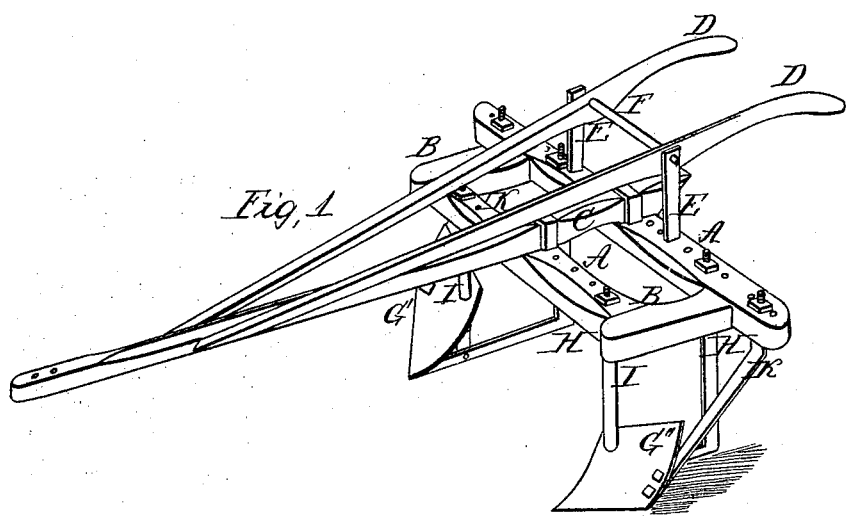
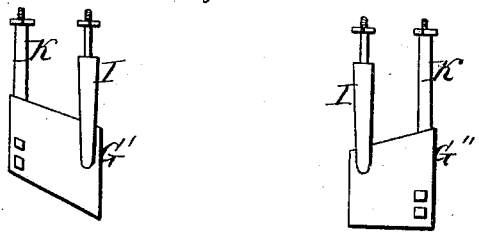

UNITED STATES PATENT OFFICE.

JNO. B. SMITH, OF PRINCESS ANNE COUNTY, VIRGINIA.

IMPROVEMENT IN CORN-CULTIVATORS.

Specification forming part of Letters Patent No. 1,121, dated April 15, 1839.

*To all whom it may concern:*

Be it known that I, JOHN BOUSH SMITH, of near Norfolk, in the county of Princess Anne and State of Virginia, have invented a new and useful Improvement in Corn-Cultivators, which is described as follows, reference being had to the annexed drawings of the same, making part of this specification.

Figure 1 is a perspective view of the cultivator; Fig. 2, a sectional view of one of the plows.

This improved corn-cultivator consists of two transverse parallel perforated beams, the rear one being longer than the forward one, united by two short timbers, with mortises and tenons, and a fifth or main beam, to which the animals are geared for drawing the machine, which last-mentioned beam is secured to the center of the perforated beams on top; also, two handles are fastened to the sides of the center beam supported by two uprights resting upon one of the perforated beams and braced by a horizontal rod passing through the uprights and handles.

There are two plows attached to the above-described frame, one on each side of the center beam, for plowing on both sides of the corn at the same time.

Each plow consists of a mold-board, land-side or bar, and share of the most approved construction. To each bar of the plow is secured a perpendicular standard or rod passing through a perforation in the mold-board, and secured to the forward parallel beam by screw and nut; also, another perpendicular rod extending from the heel of the landside to the rear parallel perforated beam, through which it passes for bracing and setting the plow, and an oblique brace extending from the heel of the mold-board through the last-mentioned beam. Both plows are furnished and arranged in a similar manner.

A A represent the parallel perforated beams; B B, the short beams connecting them together; C, the center beam; D D, the handles; E E, the uprights; F, the horizontal cross brace or rod; G G, the plows; H H, the perpendicular standard; I I, the perpendicular rods; K K, the oblique braces.

In plowing on both sides of the corn the row will be between the horses and plows, and the mold-boards from each other. To throw the earth toward the row or against the corn, the positions of the plows must be reversed, having their mold-boards toward each other. In working between two rows only one horse may be used.

The distance apart of the plows may be regulated to any degree required by means of the rods of the plows and the perforations in the beams.

This cultivator may be used for cultivating any kind of plant to which it can be applied—such as tobacco, cotton, rice, pease, beans, &c.

The lower edge of the mold-board G' rises from the point toward the heel at an angle of about ten degrees with the plane of the horizon. The edge of the other plow, G'', is parallel with the plane of the horizon. The one kind (marked G') is for plowing between two ridges, and the other is for plowing a flat surface. The angle, however, may be changed to suit the kind of plowing.

The invention claimed and desired to be secured by Letters Patent consists—

In the arrangement of the perforated beams, in combination with the shifting and reversible plows for throwing the earth from or toward the rows of corn, regulated to any width required, in the manner before described.

JNO. BOUSH SMITH.

Witnesses:
WM. P. ELLIOT,
WM. BISHOP.